US005814289A

United States Patent [19]

Tapper et al.

[11] Patent Number: 5,814,289

[45] **Date of Patent: *Sep. 29, 1998**

[54] PROCESS FOR THE PEPARATION OF COGRANULATES COMPRISING ALUMINOSILICATES AND SODIUM SILICATES

[75] Inventors: Alexander Tapper, Mönchengladbach 2; Günther Schimmel, Erftstadt-Gymnich; Gerd Wingefeld, Münstereifel-Eschweiler; Hans-Peter Rieck, Hofheim, all of Germany

[73] Assignee: Hoechst Aktiengesellschaft, Frankfurt, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 688,354

[22] Filed: Jul. 30, 1996

Related U.S. Application Data

[63] Continuation of Ser. No. 289,007, Aug. 11, 1994, abandoned, which is a continuation-in-part of Ser. No. 31,546, Mar. 15, 1993, abandoned.

[30] Foreign Application Priority Data

Mar. 28, 1992 [DE] Germany .......................... 42 10 253.7

[51] Int. Cl.[6] .............................. C01B 33/26; C11D 7/14

[52] U.S. Cl. ....................... 423/328.2; 423/332; 510/531; 510/532; 510/507; 510/511; 510/446

[58] Field of Search .................................... 570/531, 532, 570/507, 511, 446; 423/328.2, 332

[56] References Cited

U.S. PATENT DOCUMENTS

| | | | |
|---|---|---|---|
| 4,652,391 | 3/1987 | Balk | 252/99 |
| 4,728,443 | 3/1988 | Rieck et al. | 252/8.6 |
| 4,737,306 | 4/1988 | Wichelhans et al. | 252/95 |
| 4,820,439 | 4/1989 | Rieck | 252/135 |
| 4,834,902 | 5/1989 | Pioch et al. | 252/135 |
| 4,861,510 | 8/1989 | Wilms et al. | 252/174.13 |
| 5,108,646 | 4/1992 | Beerse et al. | 252/174.25 |
| 5,378,388 | 1/1995 | Pancheri | 510/315 |
| 5,393,455 | 2/1995 | Poethkow et al. | 510/476 |

FOREIGN PATENT DOCUMENTS

| | | |
|---|---|---|
| 0021267 | 1/1981 | European Pat. Off. . |
| 0249163 | 12/1987 | European Pat. Off. . |
| 0405122 | 2/1991 | European Pat. Off. . |
| 3942066 | 6/1991 | Germany . |
| 1153800 | 6/1989 | Japan . |
| 9109927 | 7/1991 | WIPO . |

*Primary Examiner*—Paul Lieberman
*Assistant Examiner*—Lorna M. Douyon
*Attorney, Agent, or Firm*—Connolly and Hutz

[57] ABSTRACT

Cogranulates of high bulk density which easily disintegrate in water and comprise aluminosilicates and crystalline sodium silicates having a layered structure. The aluminosilicates contained therein are those of the formula $$M_{2/n}O.Al_2O_3.\ XSiO_2.\ yH_2O$$

in which M is an alkali metal or alkaline earth metal, n indicates the valency of the cation, x is $\geqq$2 and y has a value of between 0 and 8. The sodium silicates have an $SiO_2/Na_2O$ ratio of (1.8 to 4.2):1. These cogranulates are prepared by mixing the pulverulent aluminosilicates and sodium silicates with one another and introducing the mixture into a zone in which it is compacted between two rolls rotating in opposite directions to form a compact. After comminution of the compact, the desired particle sizes are finally separated off from the oversize and undersize material. The cogranulates can be used in detergents and cleaning agents.

1 Claim, No Drawings

PROCESS FOR THE PEPARATION OF COGRANULATES COMPRISING ALUMINOSILICATES AND SODIUM SILICATES

This application is a continuation of application Ser. No. 08/289,007 filed on Aug. 11, 1994 now abandoned, which is a continuation-in-part of Ser. No. 08/031,546 filed Mar. 15, 1993, now abandoned.

BACKGROUND OF THE INVENTION

1. Field of the Invention

The present invention relates to cogranulates of high bulk density which easily disintegrate in water and comprise aluminosilicates and crystalline sodium silicates having a layered structure, to a process for their preparation and to their use.

2. Discussion of the Related Art

For ecological reasons, phosphate-based builders in detergents and cleaning agents, in particular alkali metal tripolyphosphates, have recently been increasingly replaced by new builder systems which normally comprise a synthetic, crystalline aluminosilicate (for example zeolite A), an alkali metal source (e.g. sodium carbonate) and at least one cobuilder. The cobuilders used are individually or in combination nitrilotriacetic acid or salts thereof, phosphonates and polycarboxylates.

The synthetic, crystalline aluminosilicate used in these builders must be a very finely divided powder having a median particle diameter $d_{50} \leqq 10$ $\mu$m. If during preparation of the aluminosilicates, during their processing or in the course of their application larger agglomerates are formed, the purpose of the cobuilders mentioned is to divide the aluminosilicates into a suspension of fine primary particles. This is necessary especially because agglomerates of aluminosilicates, specifically those of zeolite A, do not by themselves show any tendency to disintegrate in water into the primary particles.

The recent appearance of compact detergents on the market has awakened a desire for an increased bulk density of the individual components of detergents and cleaning agents, for example by spray-agglomeration or by compacting. Agglomerates or compacts of aluminosilicates, specifically of zeolite A, produced in this manner usually require an increased use of cobuilders, due to their disinclination to disintegrate in water.

A disadvantage of the cobuilders mentioned is their negative ecological rating. Thus, the polycarboxylates predominantly used today are not biodegradable. For this reason, attempts have been made to obtain an at least predominantly inorganic builder system.

Thus, U.S. Pat. No. 4,737,306 discloses finely divided, water-insoluble layered silicates of the oxide empirical formula $$MgO.a\ M_2O.b\ Al_2O_3.c\ SiO_2.\ n\ H_2O$$

in which M is sodium and/or lithium and in which a, b, c and n are a number in the ranges 0.05 to 0.4; 0 to 0.3; 1.2 to 2.0 and 0.3 to 3.0, respectively. These layered silicates, which are suitable as detergent base material in detergents and cleaning agents, are prepared by hydrothermal reaction of water-soluble sodium silicate with oxides, hydroxides or water-soluble salts of magnesium, aluminum and lithium in aqueous solution or suspension at 150° to 250° C. for 1 to 20 hours under autogenous pressure. A disadvantage of the known magnesium- and aluminum-containing layered silicates is that their water-softening effect is low. Accordingly, they must be used in the formulation in a large amount, which, owing to their insolubility in water, considerably increases the amount of sludge in the water treatment plant. Finally, in a builder system, they cannot act as a supplier of alkali.

DESCRIPTION OF THE INVENTION

Accordingly, the object of the present invention is to describe substances based on inorganic compounds which easily disintegrate in water into the primary particles and, as cobuilders, exert a disintegrating effect on agglomerates and compacts. According to the invention, they are cogranulates comprising aluminosilicates and crystalline sodium silicates having a layered structure, the aluminosilicates used being of the formula $$M_{2/n}O.Al_2O_3.xSio_2.\ yH_2O$$

in which M is an alkali metal or alkaline earth metal, n indicates the valency of the cation, x is $\geqq 2$ and y has a value of between 0 and 8, the sodium silicates having an $SiO_2/Na_2O$ ratio of (1.8 to 4.2):1.

An optional further feature of the cogranulates according to the invention can be that a) they contain at least 3% by weight of sodium silicates;

b) they contain zeolite A as the aluminosilicates;

c) their bulk density is at least 700 g/l;

d) the sodium silicates have an $SiO_2/Na_2O$ ratio of (1.9 to 2.1):1.

A process for the preparation of the cogranulates may comprise mixing the aluminosilicates and sodium silicates in pulverulent form with one another; introducing the mixture into a zone in which it is compacted under pressure to form a compact between two rolls rotating in opposite directions; comminuting the compact; and finally separating off the desired particle sizes from the oversize and undersize material.

Finally, the cogranulates according to the invention can be used in detergents and cleaning agents, for example as builders.

The crystalline sodium silicates having a layered structure and being present in the cogranulates according to the invention are slowly water-soluble, as a result of which a reduction in the amount of sludge in the water treatment plants is achieved.

Owing to the water solubility of the crystalline sodium silicates present in the cogranulates according to the invention, sodium carbonate can, if desired, be entirely excluded from the detergent or cleaning agent formulation, since the crystalline sodium silicates act as a supplier of alkali.

Since the crystalline sodium silicates present in the cogranulates according to the invention have a considerable bursting effect, even small amounts of sodium silicate in the cogranulate are sufficient for suspending agglomerates or compacts of aluminosilicate.

The crystalline sodium silicates present in the cogranulates according to the invention have a marked water-softening effect of about 75 mg of Ca/g (measured at 20° C. and a pH of 10.5 using water having a German hardness of 30°).

EXAMPLE 1

(Comparative Example)

30 kg of zeolite A were compacted at a line compacting force of 30 kN/cm in a compactor (from Bepex GmbH) having a roll diameter of 200 mm and then milled to give granules having a $d_{50}$ of 480 μm. Disintegration of the granulate in water (German hardness of 17°) was tested as a function of time using a MICROTRAC Series 9200 (from Leeds & Nothrup GmbH). In addition, the calcium-binding capacity (CBC) was determined by means of a calcium-sensitive electrode (from Orion Research Inc.) after 10 minutes at 20° C. and a pH of 10.2:

| $d_{50}$ [μm], after 1 min | $d_{50}$ [μm], after 4 min | CBC [mg of $CaCO_3$/g] | Bulk density [g/l] |
|---|---|---|---|
| 421.1 | 405.2 | 78.1 | 680 |

EXAMPLE 2

(Comparative Example)

29.7 kg of zeolite A and 0.3 kg of $Na_2Si_2O_5$ having a layered structure (δ modification) were premixed in an EIRICH mixer. The premixture was compacted analogously to Example 1 and milled to give granules having a $d_{50}$ of 510 μm. The granules were tested by the procedure of Example 1:

| $d_{50}$ [μm], after 1 min | $d_{50}$ [μm], after 4 min | CBC [mg of $CaCO_3$/g] | Bulk density [g/l] |
|---|---|---|---|
| 173.2 | 138.1 | 122.2 | 695 |

EXAMPLE 3

(according to the invention)

29.1 kg of zeolite A and 0.9 kg of $Na_2Si_2O_5$ having a layered structure (δ modification) were premixed in an EIRICH mixer. The premixture was compacted analogously to Example 1 and milled to give granules having a $d_{50}$ of 510 μm. The granules were tested by the procedure of Example 1:

| $d_{50}$ [μm], after 1 min | $d_{50}$ [μm], after 4 min | CBC [mg of $CaCO_3$/g] | Bulk density [g/l] |
|---|---|---|---|
| 56.7 | 51.0 | 170.2 | 710 |

EXAMPLE 4

(according to the invention)

21 kg of zeolite A and 9 kg of $Na_2Si_2O_5$ having a layered structure (β modification) were premixed in an EIRICH mixer. The premixture was compacted analogously to Example 1 and milled to give granules having a $d_{50}$ of 520 μm. The granules were tested by the procedure of Example 1:

| $d_{50}$ [μm], after 1 min | $d_{50}$ [μm], after 4 min | CBC [mg of $CaCO_3$/g] | Bulk density [g/l] |
|---|---|---|---|
| 18.9 | 13.3 | 187.9 | 760 |

EXAMPLE 5

(according to the invention)

Example 3 was repeated, except that 27 kg of zeolite A and 3 kg of $Na_2Si_2O_5$ having a layered structure (δ modification) were premixed in the Eirich mixer:

| $d_{50}$ [μm], after 1 min | $d_{50}$ [μm], after 4 min | CBC [mg of $CaCO_3$/g] | Bulk density [g/l] |
|---|---|---|---|
| 36.8 | 30.3 | 181.9 | 720 |

EXAMPLE 6

(according to the invention)

27 kg of zeolite A and 3 kg of kanemite ($NaHSi_2O_5 \times 3H_2O$) were premixed in an EIRICH mixer. The premixture was compacted analogously to Example 1 and milled to give granules having a $d_{50}$ of 520 μm. The granules were tested by the procedure of Example 1:

| $d_{50}$ [μm], after 1 min | $d_{50}$ [μm], after 4 min | CBC [mg of $CaCO_3$/g] | Bulk density [g/l] |
|---|---|---|---|
| 50.1 | 44.2 | 176.3 | 560 |

EXAMPLE 7

(according to the invention)

27 kg of zeolite A and 3 kg of makatite ($Na_2Si_4O_9 \times 5H_2O$) were premixed in an EIRICH mixer. The premixture was compacted analogously to Example 1 and milled to give granules having a $d_{50}$ of 534 μm. The granules were tested by the procedure of Example 1:

| $d_{50}$ [μm], after 1 min | $d_{50}$ [μm], after 4 min | CBC [mg of $CaCO_3$/g] | Bulk density [g/l] |
|---|---|---|---|
| 43.2 | 37.9 | 153.7 | 725 |

We claim:

1. A process for the preparation of cogranulates having a bulk density of at least 700 g which easily disintegrate in water and consist essentially of aluminosilicates and crystalline sodium silicates having a layered structure which process comprises mixing the aluminosilicates and the crystalline sodium silicates having a layered structure in pulverulent form with one another; introducing the mixture into a zone in which it is compacted under pressure between two rolls rotating in opposite directions to form a compact; comminuting the compact; and finally separating off the desired particle sizes from the oversize and undersize material.

* * * * *